April 10, 1928.
R. P. WHITE
BAIL EAR FOR VESSELS
Filed April 16, 1927
1,665,829
2 Sheets-Sheet 2
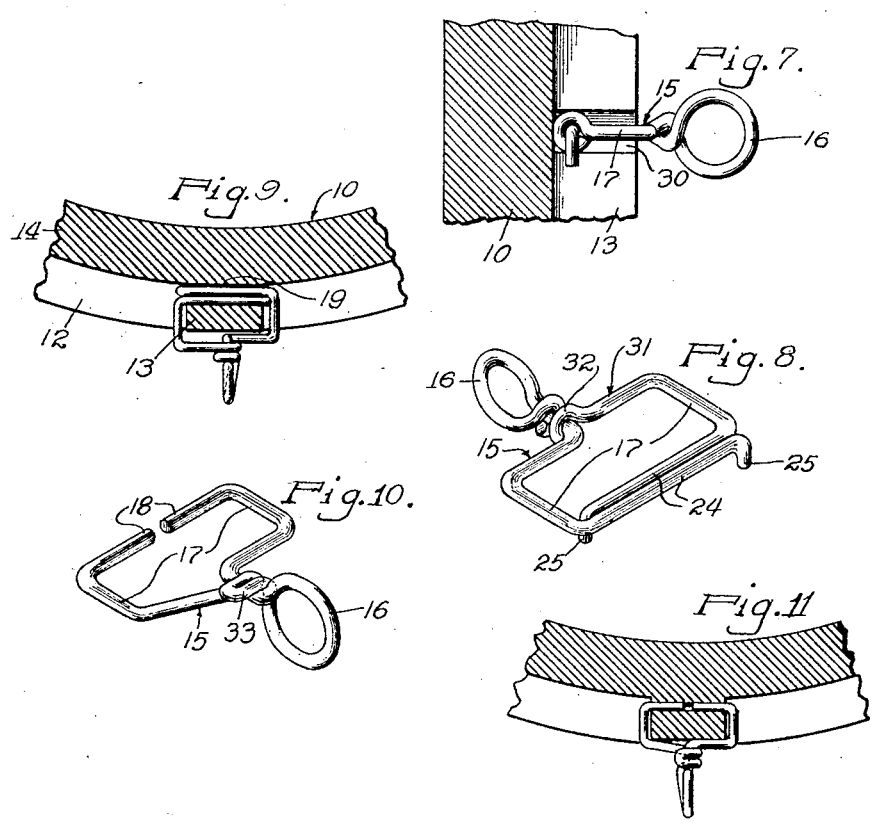
Witnesses
S. J. Collins
J. E. Appleton
Inventor
Richard P. White
By Joshua R. H. Potts
his Attorney.

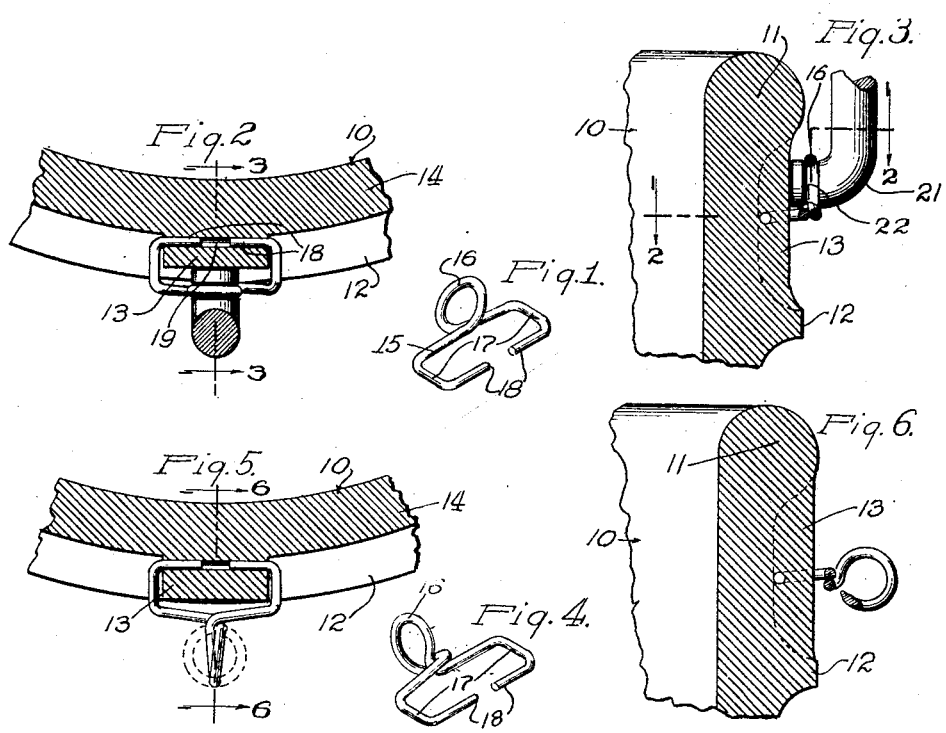

Patented Apr. 10, 1928.

1,665,829

UNITED STATES PATENT OFFICE.

RICHARD P. WHITE, OF CHICAGO, ILLINOIS.

BAIL EAR FOR VESSELS.

Application filed April 16, 1927. Serial No. 184,217.

My invention relates to bail ears and more particularly to bail ears for earthen-ware or pottery vessels or the like.

The object of my invention is to provide bail ears of the above identified character, which have simple and efficient means of interlocking with the vessels, for preventing the disengagement from the bail ears of the carrying bails, and for providing bail ears of simplified construction.

My invention will be best understood by reference to the accompanying drawings forming a part of this specification and in which, Figure 1 is a perspective view of a form of bail ears, embodying my invention.

Figure 2 is a cross-sectional view of a vessel to which my invention is applied and it is taken on substantially the line 2—2 of Figure 3.

Figure 3 is a sectional view taken on substantially the line 3—3 of Figure 2.

Figure 4 is a perspective view of a slightly modified form of my invention.

Figure 5 is a sectional view similar to Figure 2 but showing the modified form of my invention applied thereto.

Figure 6 is a sectional view taken on line 6—6 of Figure 5.

Figure 7 is a vertical sectional view showing a slightly modified form of lug.

Figure 8 is a perspective view of another modification of my invention. Figure 9 is a sectional view of a vessel showing my invention as disclosed in Figure 8 applied thereto.

Figure 10 is a perspective view of another form of my invention. Figure 11 is a cross-sectional view of a vessel showing my invention as disclosed in Figure 9 applied thereto.

In the drawings and for the purpose of illustration I have shown the preferred embodiment of my invention in which 10 designates an earthen-ware vessel having thickened portions 11 and 12 forming rims about the side wall 14 thereof and being provided with suitable lugs 13 to which the bail ears are clampingly secured as shown in the various modifications.

In Figure 1 is shown the spring wire 15 formed into a loop 16 and having arms 17 with extensions thereon and adapted to extend into opposite ends of the bore 19 in the lug 13 as best shown in Figure 2. A bail member 21 is provided with a groove 22 therein, and the loop member 16 passes around said bail member as shown in Figure 3, and the wire 15 from which the loop is formed engages into said groove 22 for holding the bail 21 in place. In Figure 4 is shown a slightly modified form of my invention, in which the loop 16 is first formed in the horizontal position as shown in dotted lines in Figure 5, and after the end members 18 are shaped into the bore 19 the loop portion is twisted into the position as shown by full lines in Figure 5.

In Figure 7 is shown another form of my invention, in which the wire 15 is formed into the usual loop 16 and the side arms 17 as previously described. The ends of arms 17 are formed into loops 27 which are adapted to receive a wire 28 therethrough. The wire 28 is passed through the bore 19 and the ends 29 of said wire are bent downwardly into clamping engagement with the loops 27. The lug 13 is provided with grooves 30 on the sides thereof and the arms 17 are positioned in said grooves in order to provide a more rigid attachment.

In Figure 8 is shown a form of my invention, in which the wire 15 is provided with the loop 16 and the arm 17, and having a lengthened extension 24. Adjacent the loop 16 is clampingly secured a member 31 by means of loop 32. The member 31 has an arm 17 and an extension 24 thereon similar to the extension on the end of member 15. These extensions 24 are provided with downwardly turned members 25 as shown, and the members 24 are adapted to pass through the bore 19 and to be clampingly secured therein by the downturned end members 25 as shown in Figure 9.

In Figure 10 is shown a form of my invention having parts similar to that disclosed in Figure 4 with the exception that a portion of the wire 15 of which the bail ear is composed is formed into a hook member 33 for engagement about another portion of the wire 15, for clampingly holding said arms 17 with their extensions 18 in the bore 19 as shown in Figure 11.

While I have described my invention in its preferred form, it is capable of variation without departing from the spirit of the invention, and I do not wish to be limited to the precise details of the construction set forth but desire to avail myself of such variations and modifications as come within the scope of the appended claims.

I claim as my invention:

1. In combination with a vessel comprising a body provided with a lug; a bore through said lug; a spring wire looped into substantially a circle, to form a bail attaching means; a bail substantially circular in cross-section provided with a groove; arms projecting from said loop in opposite directions, bent about said lug and seated in said bore for securing said bail to said vessel.

2. In combination with a vessel comprising a body provided with a lug; a bore through said lug; a spring wire looped into substantially a circle to form a bail attaching means; arms projecting from said loop in opposite directions, bent about said lug, and projecting into opposite ends of said bore.

3. In combination with a vessel comprising a body provided with a lug; a bore through said lug; a spring wire having a loop therein and near one end thereof; the other end being formed into an arm passing around one side of said lug, passing through said bore and having clamping engagement with one side of said lug; another wire bent about the first wire near said loop, and forming an arm extending around the other side of said lug, passing through said lug and having clamping engagement with the other side of said lug.

In testimony whereof I have signed my name to this specification.

RICHARD P. WHITE.